J. A. SVEJDA.
ILLUMINATING PROJECTILE.
APPLICATION FILED JUNE 27, 1918. RENEWED JUNE 14, 1920.
1,365,865.
Patented Jan. 18, 1921.
7 SHEETS—SHEET 2.
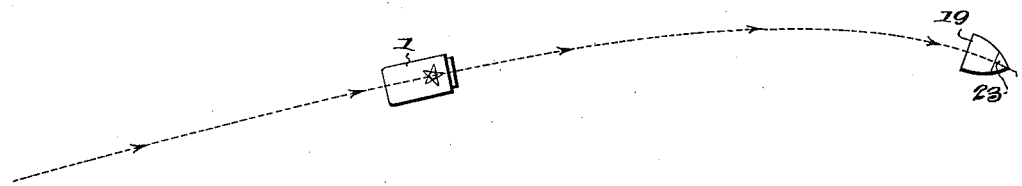
Fig.6.
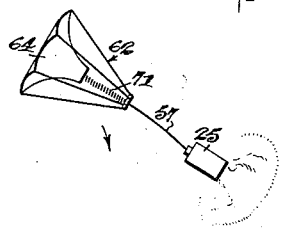
Fig.7.
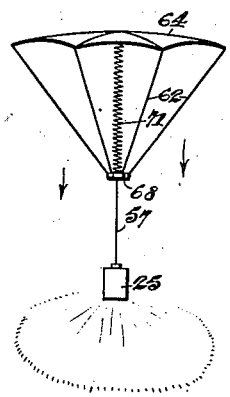
INVENTOR
J. A. Svejda.
BY
Fred G. Dieterich & Co.
ATTORNEYS J. A. SVEJDA.
ILLUMINATING PROJECTILE.
APPLICATION FILED JUNE 27, 1918. RENEWED JUNE 14, 1920.
1,365,865.
Patented Jan. 18, 1921.
7 SHEETS—SHEET 3.
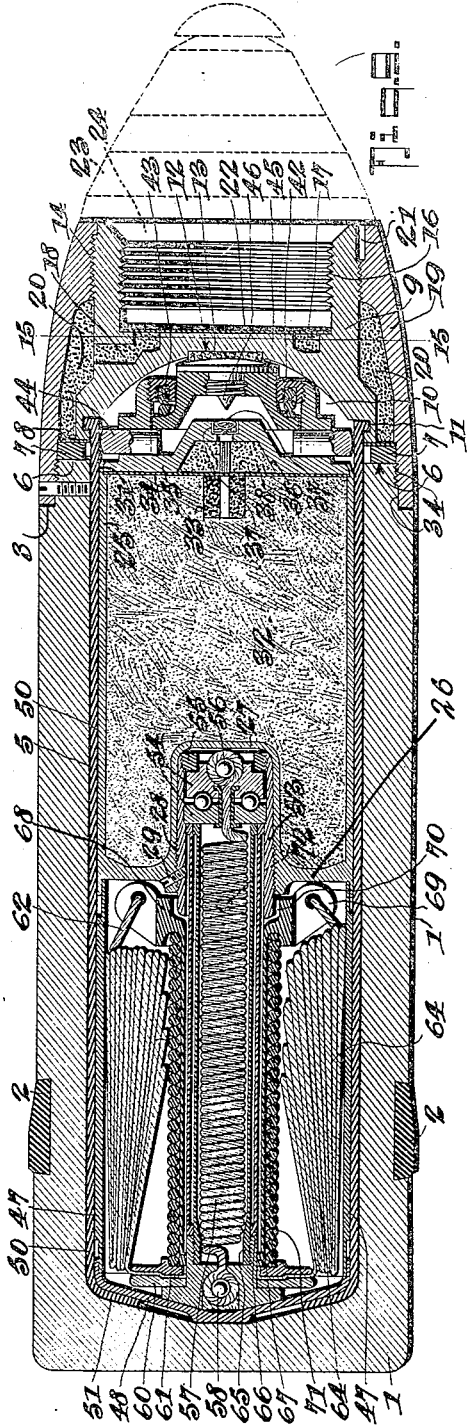
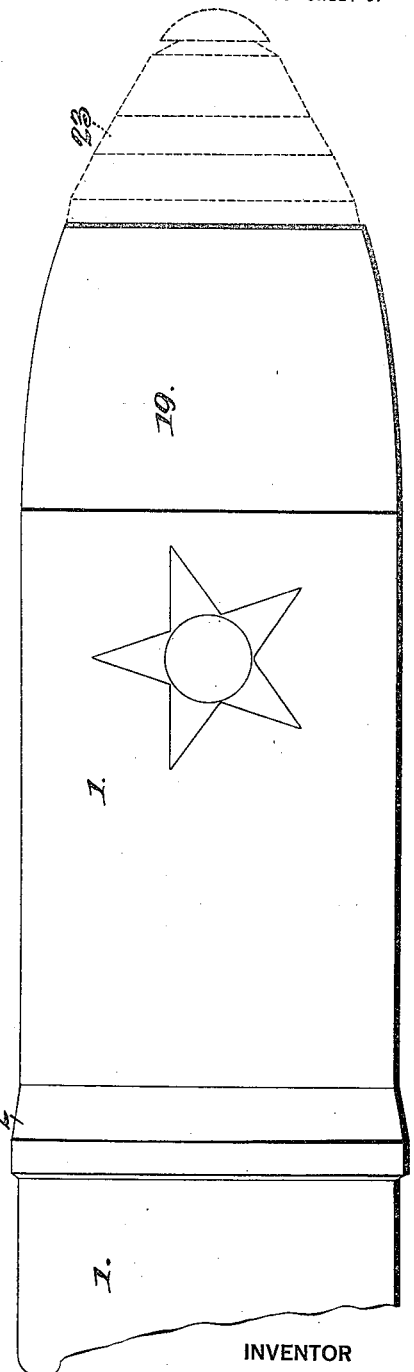
INVENTOR
J. A. Svejda.
BY
Fred J. Dieterich
ATTORNEYS

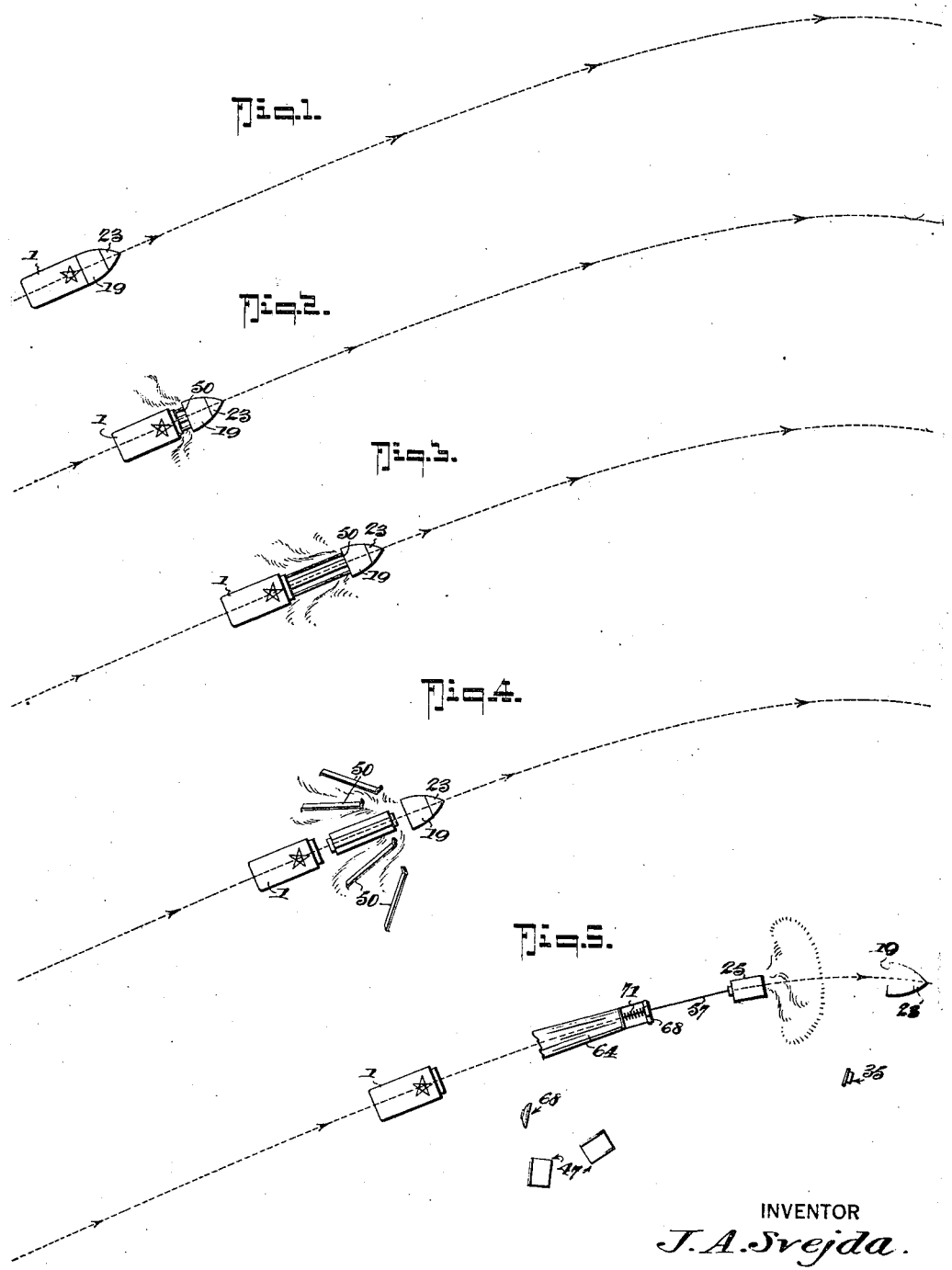

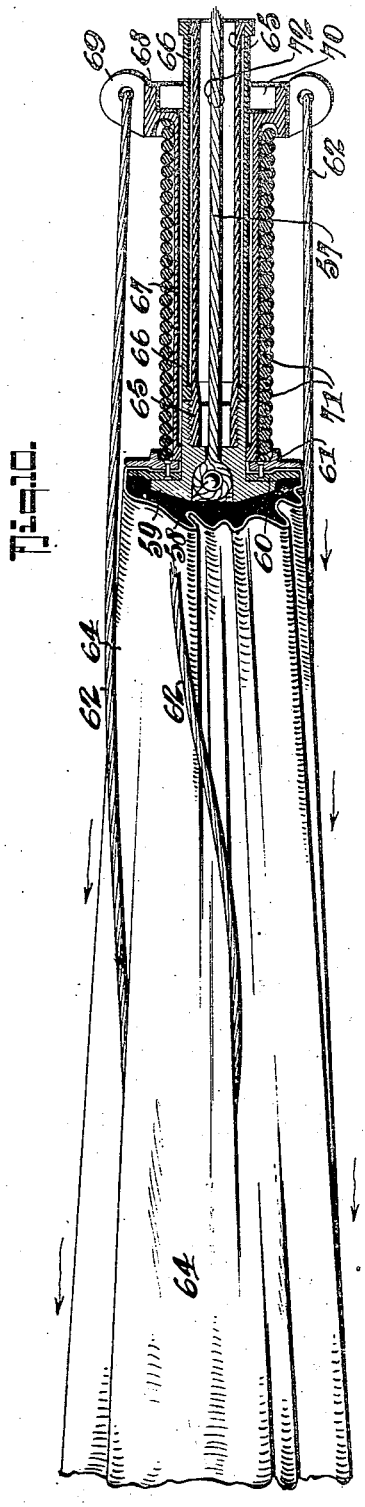

J. A. SVEJDA.
ILLUMINATING PROJECTILE.
APPLICATION FILED JUNE 27, 1918. RENEWED JUNE 14, 1920.
1,365,865.
Patented Jan. 18, 1921.
7 SHEETS—SHEET 5.
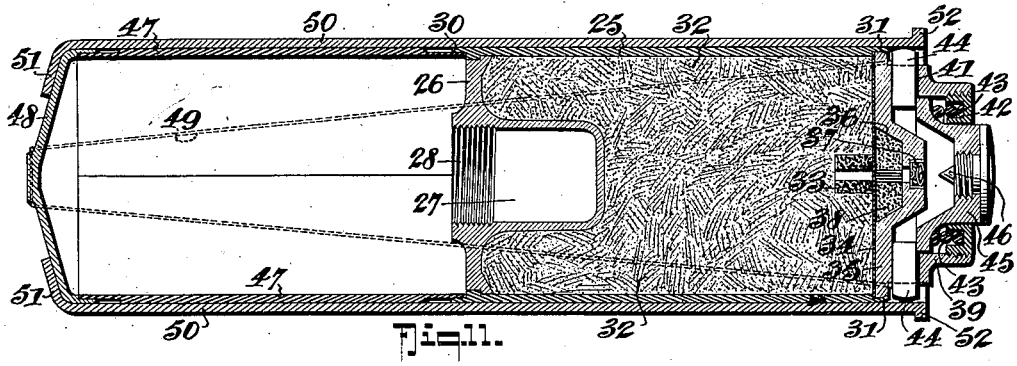
INVENTOR
J. A. Svejda.
BY
Fred J. Dieterich
ATTORNEYS

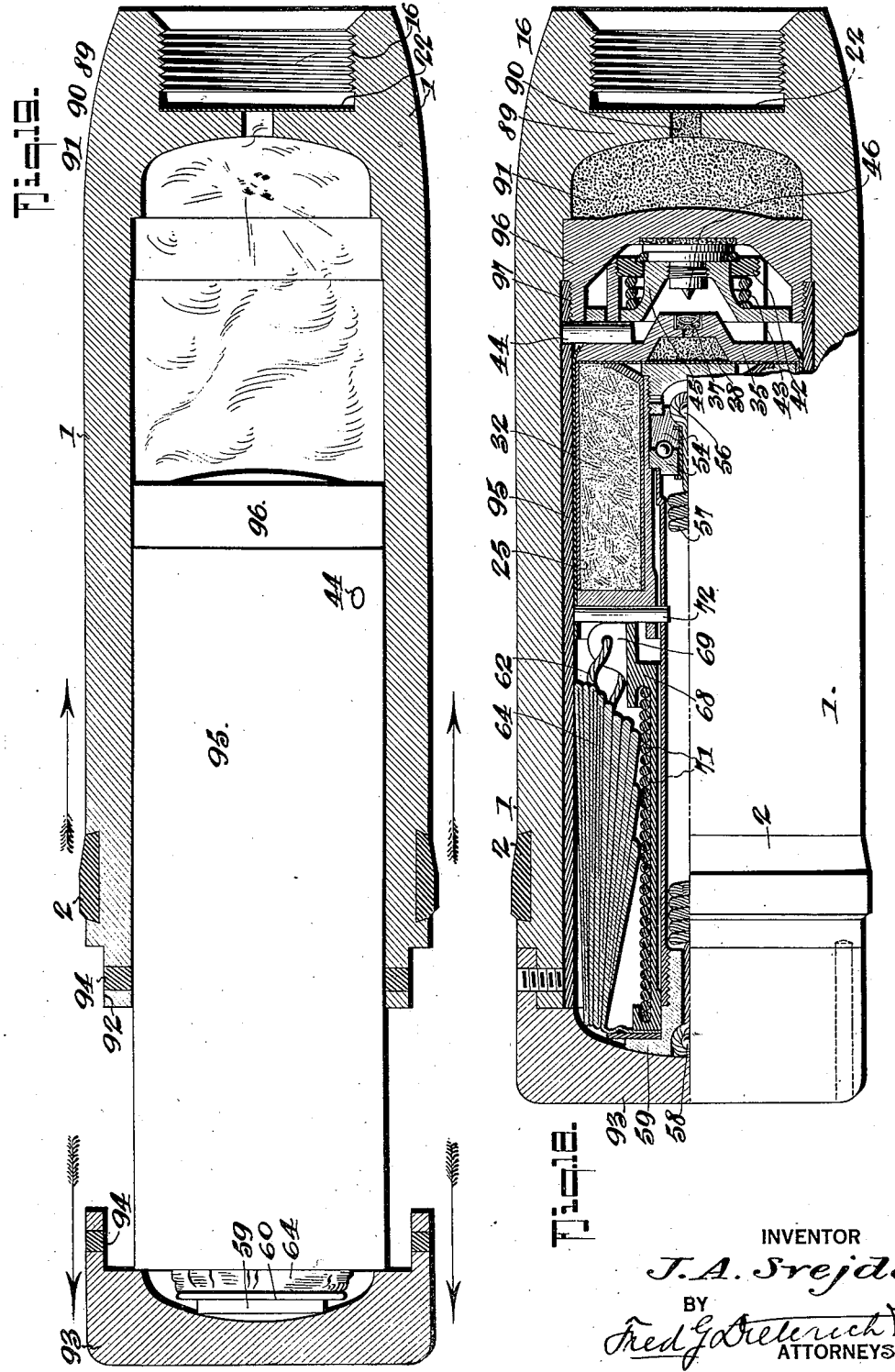

J. A. SVEJDA.
ILLUMINATING PROJECTILE.
APPLICATION FILED JUNE 27, 1918. RENEWED JUNE 14, 1920.
1,365,865.
Patented Jan. 18, 1921
7 SHEETS—SHEET 7.
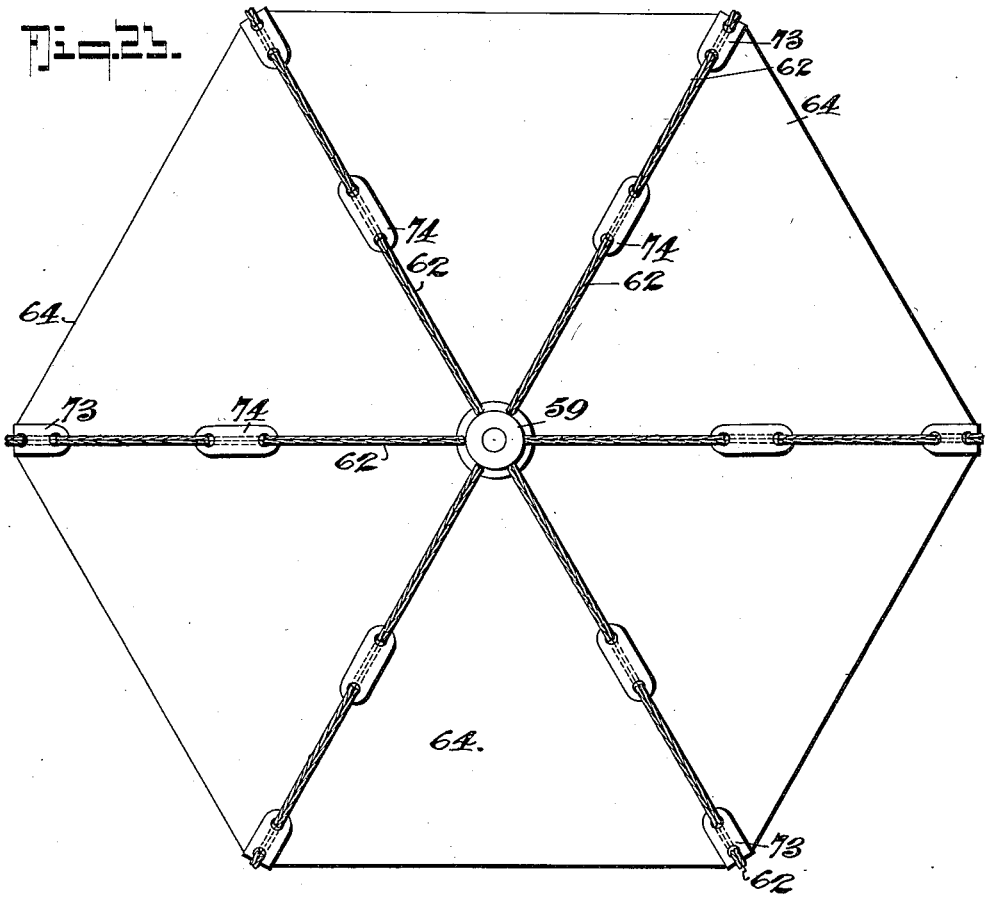
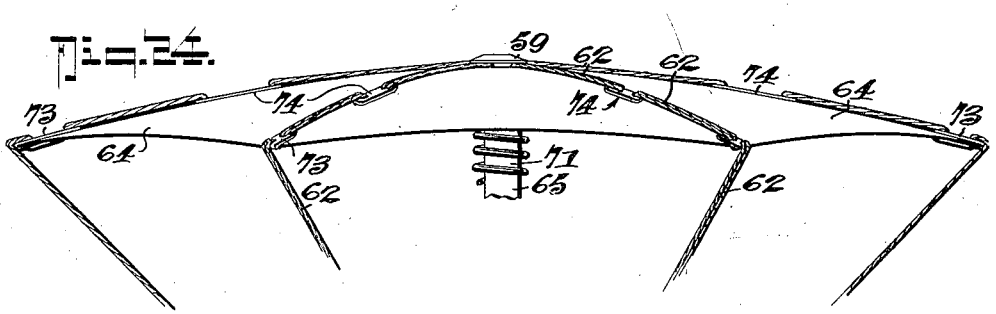
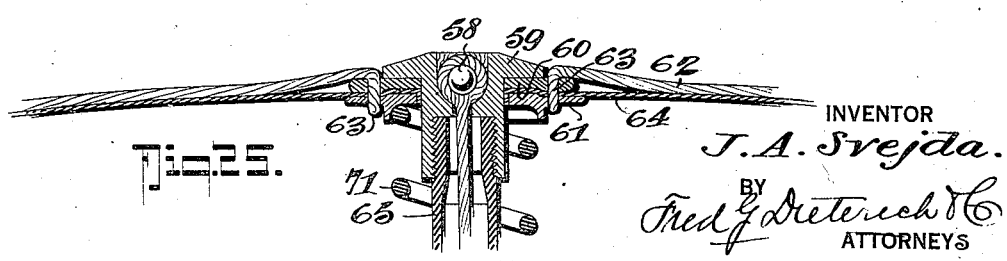
INVENTOR
J. A. Svejda.
BY
Fred J. Dieterich & Co
ATTORNEYS

UNITED STATES PATENT OFFICE.

JAROSLAV A. SVEJDA, OF BALTIMORE, MARYLAND.

ILLUMINATING-PROJECTILE.

1,365,865. Specification of Letters Patent. Patented Jan. 18, 1921.

Application filed June 27, 1918, Serial No. 341,795. Renewed June 14, 1920. Serial No. 389,002.

*To all whom it may concern:*

Be it known that I, JAROSLAV A. SVEJDA, a citizen of the United States, and a resident of the city of Baltimore, in the State of Maryland, have invented a new and Improved Illuminating - Projectile, of which the following is a specification.

My invention has for its objects to provide an illuminating projectile which will be safe to handle, is of such construction that it may be distinguished from shrapnel and will not injure the bore of the gun any more than standard shells; to provide a shell of the character stated in which the shell burster-charge acts on the casing only and will not distort the containers which are properly supported in the shell chamber so as to protect them from injury by set backs; to provide a structure in which the containers are not affected in any way by rotation of the shell and in which there is no strain on the casing from inner parts; to provide against distortion of the containers, when extracted; to provide containers which are gas tight and will not be affected by the flames from the shell burster-charge; to provide such a construction that the illuminant does not depend on the shell burster-charge for its ignition, provision being made to ignite it by a separate firing pin after the containers clear the shell burster-charge flames; to provide a parachute container which is sealed until the container burster-charge is fired and so arranged that the flames from said charge will not reach the parachute, the flames being blown in the other direction; to provide against premature firing of the container burster-charge; to provide a parachute which is so constructed that, when extracted, it will invert, forming a cone, so the great initial air resistance will act only on a minimum area (that of the disk to which the parachute is fastened), and in which provision is made for gradually opening the parachute after it has been released.

The invention especially has for its object to provide an illuminating shell of a thoroughly practical and feasible construction, which can be readily manufactured with the present shop machine equipment for manufacturing standard shrapnel.

Generically the invention comprises a shell or casing which is designed to be fixed in the cartridge in the same manner as any standard shell, the casing being composed of a plurality of sections, the shell body proper, the casing-adapter and the nose, which latter is of the usual form and construction and carries the usual time fuse mechanism; the adapter carries the shell burster-charge by which the nose is blown off and the containers are extracted from the shell; the illuminating pot or illuminant charge container, and a parachute container are arranged end to end and held together while in the shell, releasable tongs being provided which are adapted to be thrown off by centrifugal force, when the containers leave the shell, the tongs being connected with the adapter so as to extract the containers, when the shell burster-charge is ignited, the parachute container being so constructed and tied to the illuminating pot that it will not be released until the tongs clear the same and the ignition (delayed) of the pot burster-charge blows off the illuminating pot cap, thereby breaking the tie wire, igniting the illuminating charge and releasing the parachute, which latter is so designed that after the parachute casing drops off, the parachute will invert and the initial air resistance will act only on the disk which holds the parachute.

My invention also includes those novel details of construction, combination and arrangement of parts, all of which will be first fully described and then specifically pointed out in the appended claims, reference being had to the accompanying drawings, in which:

Figures 1 to 7 inclusive are diagrammatic views illustrating the operation of the invention.

Fig. 8 is a side elevation of one of the shells embodying my invention, parts being broken away.

Fig. 9 is a vertical longitudinal section of the shell, the parts being in the inactive position.

Fig. 10 is a detail elevation and part longitudinal section of the parachute in the position the parts assume just after the pot burster-charge has functioned, the parachute container has dropped off and the wind resistance has caused the inversion of the parachute "umbrella."

Fig. 11 is a vertical longitudinal section of the containers (the parachute being omitted) and extracting tongs in the inactive position which they assume while in the shell.

Fig. 12 is a detail view of the parts showing how the tongs are thrown or dropped off, the firing pin in the pot cap released as the holding pins are thrown off by centrifugal force.

Fig. 13 is a cross section on the line 13—13 on Fig. 12.

Fig. 14 is a detail view of the end of the illuminating pot just after the fulminate has been ignited by the flame from the pot burster-charge.

Fig. 15 is a cross section on the line 15—15 on Fig. 9.

Fig. 16 is a view similar to Fig. 12 showing a slight modification of the invention.

Fig. 17 is a cross section on the line 17—17 on Fig. 16.

Fig. 18 is a vertical longitudinal section and part elevation of a modification of the invention, the nose (time fuse mechanism) being omitted and the parts being in the normal or inactive relation.

Fig. 19 is a view, the shell being shown in central longitudinal section and the containers in elevation, of the form shown in Fig. 18 after the shell burster-charge has been fired.

Fig. 20 is a detail longitudinal section showing a further modification in which the shell burster-charge is located in pockets in the wall structure of the body portion of the shell rather than in the wall structure of the adapter portion of the shell.

Fig. 21 is a cross section on the line 21—21 of Fig. 20.

Fig. 22 is an elevation of the adapter disk to which the extractor tongs are hooked.

Fig. 23 is a plan view of the "umbrella" part of the parachute.

Fig. 24 is a detail side elevation of the same.

Fig. 25 is an enlarged detail section of the same.

In the drawings in which like numerals and letters of reference designate like parts in all the figures, 1 represents the body portion of the shell and 2 the shell band. The body portion of the shell 1 is shouldered at 3 and provided with shallow threads 4 which are cut away in sections to coöperate with the similarly cut threads of the outer sleeve or shell 19 of the adapter 9—19, so that the adapter may be brought into threaded engagement with the shell 1 in a manner whereby the threads may be readily broken and the adapter blown off.

5 designates the shell chamber in which the contained parts are located. 7 designates the burster-charge sealing ring which is located between the end face 6 of the body portion 1 of the shell and the end face of the inner element 9 of the adapter, a burster-charge washer 8 being located between the ring 7 and the burster-charge 20 that is contained in the pocket formed between the inner element 9 and the sleeve 19 of the adapter.

10 designates a concavity in the adapter into which the burster-charge pot cap mechanism projects.

The adapter element 9 has sockets 11 for the hook ends 52 of the tongs 50 and the adapter element 9 also is provided with a recess 12 to receive a felt or other yieldable washer 13 against which the head of the pot burster-charge firing pin 46 is adapted to rest.

The adapter element 9 and the adapter sleeve 19 are threaded together as at 14 and held from unscrewing by a suitable key pin 21, best shown in Fig. 9 of the drawings.

22 designates a shell burster-charge washer which is located in the bottom of the chamber having the internal threads 16 into which the threaded shank 24 of the time fuse carrying nose 23 projects (the nose 23 and time fuse mechanism being of any well known construction and forming *per se* no part of my invention, is not illustrated in detail). The adapter element 9 has an annular groove 17 and a bore 18 that effects communication with the groove 17 and the chamber 20, the recess 17, bore 18 and chamber 20 being filled with the shell burster-charge.

25 designates the illuminating pot, one end of which is closed by a wall 26 (formed as a separate part, Fig. 11, or as an integral part of the pot Fig. 9), the wall 26 having a cup-like member 27 internally threaded as at 28 to receive the parachute adapter connection 53 which is designed to be screwed into the socket or cup member 27 and held by a retaining pin 29. The pot 25 has a flange 30 with which the sectional parachute container shell 47 engages.

At the forward end, the pot 25 is closed by a cap 35 which also acts as the illuminating pot burster-charge carrier. The pot burster-charge carrier or cap 35 is separated from the illuminant charge 32 by a washer 34 and is held to the pot by slightly upsetting the end of the pot as at 31.

33 is the fulminate that is adapted to be ignited by the flames from the pot burster-charge 38 contained in the chamber 36 of the cap 35, the cap also having a chamber to receive the firing cap 37 which is adapted to be set off by engagement of the firing pin 46 which is located in the body of the firing pin carrier 45, the carrier 45 being slidable in the tubular projecting portion 39 of the pot burster-charge carrier or cap 35 and is designed to be projected into engagement with the firing cap 37 by a spring 43 which is held in place by an internal nut 42 which also serves as a guide for the firing pin carrier. The pot burster-charge carrier 35 has pin holes 41 to receive the firing pin carrier stops 44 which are held in place by engaging the tongs 50, when the parts are assembled (as shown in Fig. 9) and which are adapted to be thrown off by centrifugal force when the tongs 50 fall off after the containers have been extracted from the shell.

47 designates the body of the parachute container, one end of which sets in the flange 30 of the pot 25 while the other end is closed by a cap 48, the cap 48 being held in place and the container 47 being held in place by tie wires 49 that pass around the containers and the pot burster-charge carrier, the wires 49 being adapted to be broken when the pot burster-charge is ignited to blow off the pot burster-charge carrier, as will be more fully understood later.

The tongs 50, of which any number may be provided, have fingers 51 to lay over the cap 48 and shoulders 52 to engage in the adapter body of the recesses 11.

The parachute mechanism comprises a connector 53 which, as before stated, is screwed into the socket 27 and secured by a pin 29. Within the connector 53 is a ball bearing swivel element 54 to which the suspension cable 57 is anchored as at 56, the bearing 54 being held in place by a ring 55 threaded into the connector 53. The other end of the cable 57 is anchored at 58 in the parachute locking cap 59 while the "umbrella" fabric 64 (composed of a suitable material, preferably rendered fireproof in any well known way) being clamped between the parachute disk 60 and spring cup 61, the parachute lines 62 being carried through the disk 60 and flange of the cup 61 as at 63 and as above indicated in Fig. 25, and radiating to the periphery of the "umbrella" passing through the eyelets 74 and the corner eyelets 73.

65 designates the inner section of the telescopic rod, which section is screwed into the parachute locking cap 59 and preferably held permanently therein in any desired manner. The cable 57 is adapted to be coiled inside the hollow section 65 (see Fig. 9). The parachute rod may be composed of any number of telescopic sections, three sections 65, 66 and 67 being indicated in the drawings, the outermost section 67 carrying the parachute lines-spider and spring cup member 68, to the ears 69 of which the lines 62 are connected. The spider 68 is cupped at 70 to fit over the end of the connector 53, when the parts are assembled (see Fig. 9) and a holding pin 72 is passed through apertures in the members 66, 65 and 53 (see Fig. 9) to hold these parts together against the action of the spring 71, when the parts are contained within the shell, the pin 72 being of sufficient length to engage one wall of the container 47 to prevent the pin from being thrown out until the container 47 is released or falls off, after extraction of the containers from the shell.

By referring to Figs. 16 and 17, it will be observed that instead of constructing the pot burster-charge carrier, as shown in Figs. 11 and 12, the tubular extension 39 may be cut away at intervals and the firing pin carrier 45 may have radial ears 76 to interengage with the remaining parts of the extension 39 (see Fig. 17) and a sectional ring 77 may be interposed between the parts 76 and the flange of the carrier 35 to hold the firing pin in its retracted position, the ring section 77 being adapted to be thrown off by centrifugal force (Fig. 16) when the tongs are released.

In Fig. 20, I have shown another modification of the invention in which the burster-charge is contained in recesses or chambers 86 in the wall structure of the body portion of the shell, the adapter 78 being of one piece and threaded at 79 to the body portion of the shell, an adapter charge washer 80 being carried by the adapter 78 and having openings 85 in which the hook ends 11 of the tongs are passed.

81—82 designate a channel in which a part of the burster-charge is contained to effect communication with the recess 83 when the charge is fired by action of the time fuse mechanism.

The several pockets 86 have communicating channels 87 (see Fig. 21). 84 is a recess in the adapter 78 which communicates with the fulminate 33 and with the charge at 83, so that, when the adapter charge 87 is ignited, the charge in the ignition pot may also be ignited, it being understood that the charge in the chamber 84 is preferably of such nature as to cause a somewhat delayed action, as for example a slower burning charge in the chamber 84 may be employed than is the shell burster-charge.

The illuminating pot 25 has its inner end, in this form, upset inwardly, as at 88, to form an abutment against the washer 80.

In Figs. 18 and 19 is shown another modification of the invention. In this form, the shell is composed of three sections, the body portion 1, the cap 93 and the inner shell 95—96, the inner shell 95 being of thin tubular material and closed at one end by the cap 96, while the other end abuts the cap 93, thus leaving a chamber 91 for the burster-charge between the wall 89 and the wall formed by the cap 96, the parts 96 and 95 being screw threaded together as at 97, the part 96 having the chamber into which the pot burster-charge carrier projects.

90 is the connecting passage between the burster-charge chamber and the time fuse nose through which the burster-charge is ignited by the action of the time fuse (the time fuse nose being omitted in Figs. 18 and 19).

The body portion 1 of the shell and the cap 93 are lapped jointed as at 92 and secured by a pin 94 which is adapted to be sheared off by the force of the exploded burster-charge.

The illuminating pot 25 and the parachute mechanism are contained within the inner chamber of the shell 95 and, in this form, the parachute container may be omitted, if desired.

In this form, when the pot burster-charge is ignited, its force is spent between the walls 89 and 96 and is transmitted through the shell section 95 to the cap 93, thus blowing off the cap 93 and expelling the parts 96—95—93 as a unit from the body portion. As soon as these parts separate from the body portion 1, centrifugal force will throw out the pins 44 and release the firing pin 46 to effect ignition of the pot burster-charge and the pin 72 will also fly out to release the parachute mechanism.

In operation, assume the parts to be assembled in the position shown in Fig. 9, also that the shell is fixed in the cartridge in the same manner as any standard shell and the time fuse is set to the required time of flight in the usual manner.

Upon firing the shell from the gun, as the shell approaches its maximum elevation (see Fig. 1) the time fuse will act to ignite the shell burster-charge (see Fig. 2) which blows off the adapter from the shell, shearing the threads 4 in doing so and causing the adapter and nose 23 to travel relatively at a greater velocity than the body portion 1 of the shell, thus the containers are drawn out of the body portion of the shell by the tongs 5.

As soon as the containers have been drawn out of the shell (see Fig. 4), the tongs fly off by centrifugal force, the pins 44 fly out, thus releasing the firing pin 46 to permit it to act, the tie wires 49 holding the parachute container 47 and cap 48 to the illuminating part.

As soon as the firing pin 46 has been permitted to act and the pot burster-charge 38 ignited, the pot burster-charge will blow off the cap or burster-charge carrier 35, thus breaking the wires 49.

As soon as this occurs, the cap 48 is released and the sections of the container 47 fly off (see Fig. 5) thus releasing the parachute mechanism from connection with the connector 53 and the air resistance immediately turns the parachute "umbrella" wrong side out or inverts the same, thereby holding the spring 71 under compression and the pin 72 is thrown out by centrifugal force to release the telescopic tubes.

As soon as the pin 72 is thrown out the spring 71 will commence to open the parachute (see Fig. 6) until the parachute has been fully opened and assumes its vertical position, (see Fig. 7).

The ignition of the pot burster-charge causes the ignition of the illuminant charge in the illuminating pot and the function of the shell has been completed.

Various modifications in the design and arrangement of the parts can be made to adapt the invention to particular uses to which it may be put and I desire it understood that the forms shown in the drawings are preferred constructions and are not intended as limitations on the scope of the appended claims, as I desire it understood that various modifications and rearrangements of parts can be made without departing from the spirit of the invention or the scope of the appended claims.

The shell may have a star or other indicia on its exterior surface to distinguish it from shrapnel.

What I claim is:

1. A plural-part shell, an illuminating pot, and a parachute mechanism inclosed in said shell, means for effecting separation of said shell parts and the removal of said pot and parachute therefrom, means for releasing the parachute and igniting the pot charge after the parachute and pot have been extracted from the shell, and a sustaining connection between the parachute and pot.

2. A shell, a parachute container and an illuminating pot held in said shell, a parachute in said container, an illuminating charge in said pot, a pot burster-charge carrier cap on said pot, means tying said container, said pot and said pot-burster charge carrier together, a pot-burster-charge in said carrier, a firing pin mechanism for effecting ignition of said pot burster-charge, releasable means holding said firing pin against action while the pot is within the shell, a sustaining connection between said parachute and said pot, an adapter held on the shell, a time fuse nose for the adapter, a shell burster-charge designed to be set off by the action of the time fuse mechanism, and means operated by the shell burster-charge in blowing the shell apart for extracting the parachute container and the pot from the shell, thereby releasing the pot cap firing pin to ignite the pot burster-charge and the illuminant and effect a separation of the tying means and a release of the parachute.

3. A separable-section shell, a shell-burster-charge located in a recess in the wall structure of one of the shell sections, a time fuse nose for igniting said shell burster-charge, a parachute and an illuminating pot held within the shell, a sustaining connection between the parachute and the pot, and means operable by the action of said shell-burster-charge for extracting the parachute and pot from the shell and means for releasing the parachute and igniting the pot charge after the parachute and pot have been extracted from the shell.

4. A separable-section shell, a shell burster-charge located in a recess in the wall structure between two of the shell sections, a time fuse nose for igniting said shell burster-charge, a parachute and an illuminating pot held within the shell, a sustaining connection between the parachute and the pot, and means operable by the action of said shell burster-charge for extracting the parachute and pot from the shell and releasing the same therefrom, means holding the parachute and pot together as a unit during the extraction of the same from the shell, and means for breaking the unity of the parachute and pot to permit action of the parachute and effect ignition of the illuminating pot charge.

5. A separable-section shell, a shell burster-charge located in a recess in the wall structure between two of the shell sections, a time fuse nose for igniting said shell-burster-charge, a parachute and an illuminating pot held within the shell, a sustaining connection between the parachute and the pot, and means operable by the action of said shell burster-charge for extracting the parachute and pot from the shell and releasing the same therefrom, means holding the parachute and pot together as a unit during the separation of the same from the shell and delayed-action means for "breaking" the unity of the parachute and pot after the same have been extracted from the shell to permit action of the parachute and means for igniting the illuminating pot charge.

6. A shell comprising a body portion and a cap portion, a shell burster-charge within a recess in the wall structure of the shell for effecting separation of the cap from the shell, a time fuse nose for the shell adapted to ignite the shell burster-charge; an illuminating pot and a parachute mechanism inclosed within the shell, means for protecting said parachute and pot against the flame of the shell burster-charge, and means for opening the pot and igniting the illuminant after the pot and parachute have been extracted from the shell.

7. A shell comprising a body portion and a cap portion, a shell burster-charge within the wall structure of the shell for effecting separation of the cap from the shell, a time fuse nose for the shell adapted to ignite the shell burster-charge; an illuminating pot and a parachute mechanism inclosed within the shell, means for protecting said parachute and pot against the flame of the shell burster-charge, and means for freeing the parachute opening the pot and igniting the illuminant after the same have been extracted from the shell.

8. In a structure of the character described, a shell comprising a body portion, an adapter and a time fuse nose, said adapter having a breakable connection with the body portion, a burster-charge contained within the wall structure of the shell and adapted to be ignited by the action of the time fuse nose; a plurality of containers within the chamber of said shell, means holding said containers together while in the shell, and means carried by said adapter for extracting said containers from the shell chamber after ignition of said burster-charge.

9. In a structure of the character described, a shell comprising a body portion, an adapter and a time fuse nose, said adapter having a breakable connection with the body portion, a burster-charge contained within the wall structure of the shell and adapted to be ignited by the action of the time fuse nose; a plurality of containers within the chamber of said shell, means holding said containers together while in the shell, and means carried by said adapter for extracting said containers from the shell chamber after ignition of said burster-charge, and means for releasing said container holding means after extraction to permit separation of said containers from one another.

10. In a structure of the character described, a shell comprising a body portion, an adapter and a time fuse nose, said adapter having a breakable connection with the body portion, a burster-charge contained within the wall structure of the shell and adapted to be ignited by the action of the time fuse nose; a plurality of containers within the chamber of said shell, means holding said containers together while in the shell, and means carried by said adapter for extracting said containers from the shell chamber after ignition of said burster-charge, and means for releasing said container holding means after extraction to permit separation of said containers from one another, an illuminant in one of said containers, a parachute in another of said containers, a sustaining connection between the parachute and the illuminant container, and means for effecting release of said parachute from its container, and means for igniting said illuminant.

11. In a structure of the character described, a shell comprising a body portion, an adapter and a time fuse nose, said adapter having a breakable connection with the body portion, a burster-charge contained within the wall structure of the shell and adapted to be ignited by the action of the time fuse nose; a plurality of containers within the chamber of said shell, means holding said containers together while in the shell, and tongs carried by said adapter for extracting said containers from the shell chamber after ignition of said burster-charge.

12. In a structure of the character described, a shell comprising a body portion, an adapter and a time fuse nose, said adapter having a breakable connection with the body portion, a burster-charge contained within the wall structure of the shell and adapted to be ignited by the action of the time fuse nose; an illuminating pot including a pot burster-charge carrier member, an illuminant within said pot, a burster and igniting charge within said carrier, a firing pin mechanism carried by said carrier, and means releasable upon extraction of said containers from said shell for effecting action of said firing pin, and a parachute device for suspending said pot, said parachute device being adapted to be contained within said shell, and means operable under the action of said shell burster-charge for extracting said pot and parachute device from the shell.

13. In a structure of the character described, a shell comprising a body portion, an adapter and a time fuse nose, said adapter having a breakable connection with the body portion, a burster-charge contained within the wall structure of the shell and adapted to be ignited by the action of the time fuse nose; an illuminating pot including a pot burster-charge carrier member, an illuminant within said pot, a burster and igniting charge within said carrier, a firing pin mechanism carried by said carrier, and means releasable upon extraction of said containers from said shell for effecting action of said firing pin, a separable section container, means holding said container and pot together while in the shell, means releasable from said container and pot for extracting the same from the shell under the influence of said shell burster-charge action, a parachute device in said separable section container and a sustaining connection between the parachute device and said pot.

14. In a structure of the character described, a shell comprising a body portion, an adapter and a time fuse nose, said adapter having a breakable connection with the body portion, a burster-charge contained within the wall structure of the shell and adapted to be ignited by the action of the time fuse nose; an illuminating pot including a pot burster-charge carrier member, an illuminant within said pot, a burster and igniting charge within said carrier, a firing pin mechanism carried by said carrier, and means releasable upon extraction of said containers from said shell for effecting action of said firing pin, a separable section container, means holding said container and pot together while in the shell, means releasable from said container and pot by centrifugal force for extracting the same from the shell under the influence of the shell burster-charge action, a parachute device in said separable section container and a sustaining connection between the parachute device and the pot.

15. In a structure of the character described, a shell comprising a body portion, an adapter and a time fuse nose, said adapter having a breakable connection with the body portion, a burster-charge contained within the wall structure of the shell and adapted to be ignited by the action of the time fuse nose; an illuminating pot including a pot burster-charge carrier member, an illuminant within said pot, a burster and igniting charge within said carrier, a firing pin mechanism carried by said carrier, and means releasable upon extraction of said containers from said shell for effecting action of said firing pin, a separable section container, means holding said container and pot together while in the shell, means releasable from said container and pot by centrifugal force for extracting the same from the shell under the influence of the shell burster-charge action, a parachute device, a parachute "umbrella," a telescopic-section rod, a spring tending to extend said rod to spread the "umbrella," releasable means locking the sections of said rod against extension and holding the same in fixed relation to said pot, cables connecting said "umbrella" with the outermost section of said rod whereby the "umbrella" will become inverted under wind pressure and gradually open under spring pressure.

16. A shell comprising a body portion, an adapter and a time fuse nose, said adapter having, in its wall structure, a pocket with a contained burster-charge that is adapted to be ignited by the time fuse and having a breakable connection with said body portion; a plurality of containers inclosed in the shell chamber, means engaging said containers and connected to said adapter for extracting said containers from the shell body portion and releasing the same.

17. A shell comprising a body portion, an adapter and a time fuse nose, said adapter having, in its wall structure, a pocket with a contained burster-charge that is adapted to be ignited by the time fuse and having a breakable connection with said body portion; a plurality of containers inclosed in the shell chamber, means engaging said containers and connected to said adapter for extracting said containers from the shell body portion and releasing the same, means holding said containers together as a unit until extracted, and means including a container burster-charge for effecting a release of said holding means and consequent separation of said containers.

18. A shell comprising a body portion, an adapter and a time fuse nose, said adapter having, in its wall structure, a pocket with a contained burster-charge that is adapted to be ignited by the time fuse and having a breakable connection with said body portion; a plurality of containers inclosed in the shell chamber, means engaging said containers and connected to said adapter for extracting said containers from the shell body portion and releasing the same, a parachute in one container, a sustaining connection between said parachute and another container, and means holding said containers together during the extraction period.

19. A shell comprising a body portion, an adapter and a time fuse nose, said adapter having, in its wall structure, a pocket with a contained burster-charge that is adapted to be ignited by the time fuse and a breakable connection with said body portion; a plurality of containers inclosed in the shell chamber, means engaging said containers and connected to said adapter for extracting said containers from the shell body portion and releasing the same, a parachute in one container, a sustaining connection between said parachute and another container, and means holding said containers together during the extraction period, said means comprising tie wires, a pot burster-charge carrier cap for one of said containers, a burster-charge in said cap for opening said last named container and breaking said tie wires to release the several containers and permit said parachute to act.

20. In ordnance, an illuminating pot having one end closed, a connector secured to said closed end and carrying a cable swivel, a cable attached to said swivel, a cap for the other end of said pot, a pot burster-charge in said cap and a firing pin mechanism carried by said cap, releasable means holding said firing pin inactive at times, a parachute mechanism comprising an "umbrella", a telescopic section tubular rod in which said cable is adapted to be coiled, a spring for extending the sections of said rod, said cable being attached to said parachute mechanism, guy cables from the edge of the "umbrella" to one of the outer rod sections, and a releasable means for holding said rod sections telescoped and connected with said adapter.

21. In ordnance, an illuminating pot having one end closed, a connector secured to said closed end and carrying a cable swivel, a cable attached to said swivel, a cap for the other end of said pot, a pot burster-charge in said cap and a firing pin mechanism carried by said cap, releasable means holding said firing pin inactive at times, a parachute mechanism comprising an "umbrella", a telescopic section tubular rod in which said cable is adapted to be coiled, a spring for extending the sections of said rod, said cable being attached to said parachute mechanism, guy cables from the edge of the "umbrella" to one of the outer rod sections, and a releasable means for holding said rod sections telescoped and connected with said adapter, and a sectional container for the parachute mechanism, and means for holding the container sections together to said pot and adapted to be released by the action of the said pot burster-charge.

22. In a structure of the class described, a shell, a parachute device comprising an "umbrella", a tubular rod, a line anchor guided on said rod, a spring for forcing said anchor to open the "umbrella", releasable means holding said anchor with the spring compressed, cables connecting said "umbrella" with said anchor whereby the "umbrella" will become inverted under wind pressure after the parachute is released from the shell and gradually open under spring pressure.

23. In ordnance, an illuminating pot, a parachute comprising an "umbrella", a tubular rod, a line anchor guided on said rod, a spring for forcing said anchor to open the "umbrella", releasable means holding said anchor with the spring compressed, cables connecting said "umbrella" with said anchor whereby the "umbrella" will become inverted under wind pressure and gradually open under spring pressure, and a flexible connection between the parachute and the illuminating pot.

JAROSLAV A. SVEJDA.